S. B. OAKES.
ELECTRIC COOKER.
APPLICATION FILED JAN. 17, 1916.
1,227,488.
Patented May 22, 1917.
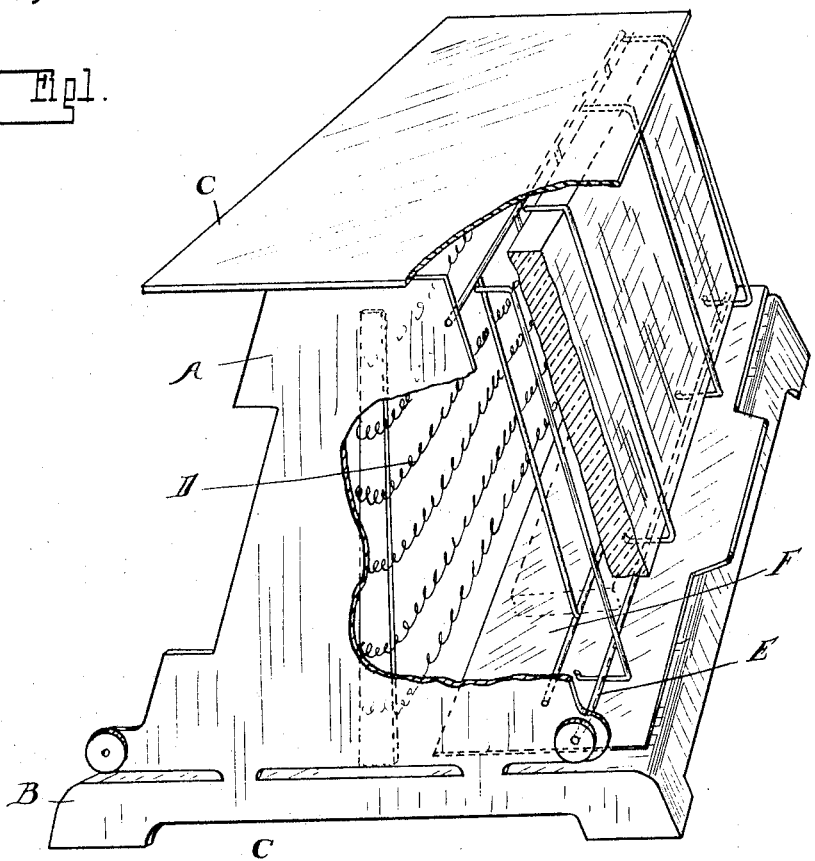
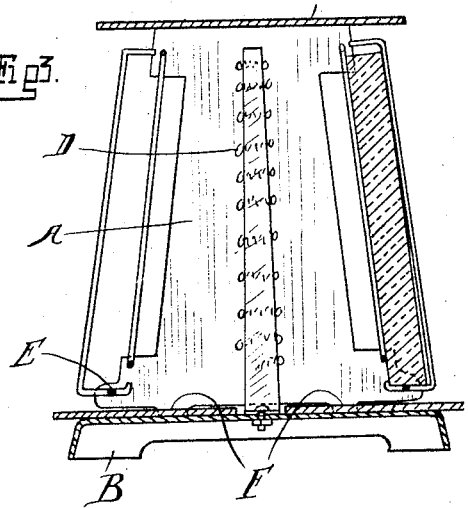
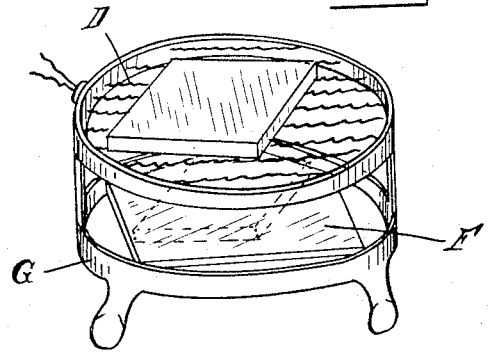
Inventor
Stanley B. Oakes
By Whittemore Hulbert + Whittemore
Attorneys

UNITED STATES PATENT OFFICE.

STANLEY B. OAKES, OF FLINT, MICHIGAN.

ELECTRIC COOKER.

1,227,488.

Specification of Letters Patent.   Patented May 22, 1917.

Application filed January 17, 1916.   Serial No. 72,429.

*To all whom it may concern:*

Be it known that I, STANLEY B. OAKES, a citizen of the United States of America, residing at Flint, in the county of Genesee and State of Michigan, have invented certain new and useful Improvements in Electric Cookers, of which the following is a specification, reference being had therein to the accompanying drawings.

The invention relates to electric cookers, being more particularly applicable to electric toasters. With such constructions it is usual to place the bread or other material to be toasted substantially parallel to the face of the heat-radiating unit, in a position where it is difficult or impossible to observe the work. Consequently it is necessary to either frequently remove the work for inspection or to accurately time the operation to avoid burning. With my improved construction I have provided means for observing the condition of the work without the necessity of removing the same, such means consisting essentially of a suitably-arranged mirror. This is applicable either to a toaster or to any other cooking apparatus where the work is concealed.

In the drawings:

Figure 1 is a sectional perspective view of an electric toaster to which my improvement is applied;

Fig. 2 is a similar view showing a modified construction; and

Fig. 3 is a sectional view, partly in perspective, through Fig. 1.

A is the frame of the toaster which is mounted upon a suitable base B, and is preferably provided with a top shelf C. D is a heating unit arranged in a central vertical plane between the opposite sides of the frame. E are hinged work-supporting grids adapted to receive the bread or other food to be toasted and in working position to hold the same substantially parallel to the heating-unit D.

With the construction as thus far described, it would be difficult or impossible to inspect the inner face of the bread during the toasting operation. There is, however, sufficient space between the heating unit and the work to expose the base of the frame to observation. I have therefore provided this base with a mirror face F, which will reflect the image of the work and will enable the attendant to observe the condition of the same.

In Fig. 2 I have shown a different construction of toaster, in which the heat-radiating surface is arranged horizontally and the surface toasted faces downward. With this construction the reflector, such as F, is placed upon the shelf G or other support beneath the resistor, and as the latter is of the open type the toasted surface may be observed.

It is obvious that the reflector may be advantageously applied to other constructions than those specifically shown.

What I claim as my invention is:—

1. In a cooker, the combination with a heat-radiating element and means for supporting the work opposite the same, of a mirror arranged for the observation of the reflection of the inner face of the work.

2. In a cooker, the combination with a heat-radiating surface and means for supporting the work opposite said surface, of a mirror for observing the inner face of the work, arranged out of the path of the heat rays which impinge upon the work.

3. The combination with a heat-radiating surface and means for supporting the work in substantial parallelism thereto, of a mirror observable through the space between said radiating surface and work and showing the reflection of the latter.

4. The combination with a heat-radiating surface and means for supporting the work opposite said surface to conceal the same, of a mirror arranged at an angle to the inner surface of the work and reflecting the same to a convenient point of observation.

In testimony whereof I affix my signature.

STANLEY B. OAKES.